United States Patent
Sridhar et al.

(10) Patent No.: US 7,259,331 B2
(45) Date of Patent: *Aug. 21, 2007

(54) LIGHTWEIGHT ARMOR WIRES FOR ELECTRICAL CABLES

(75) Inventors: Garud Sridhar, Stafford, TX (US); Joseph P. Varkey, Missouri, TX (US); Anthony Collins, Houston, TX (US)

(73) Assignee: Schlumberger Technology Corp., Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/330,957

(22) Filed: Jan. 11, 2006

(65) Prior Publication Data

US 2007/0158095 A1    Jul. 12, 2007

(51) Int. Cl.
*H01B 7/18* (2006.01)
(52) U.S. Cl. ............................. 174/102 R; 174/126.1
(58) Field of Classification Search ............ 174/106 R, 174/113 R, 126.1, 126.2, 102 R
See application file for complete search history.

(56) References Cited

U.S. PATENT DOCUMENTS

| | | | | |
|---|---|---|---|---|
| 1,679,518 A | * | 8/1928 | Fowle | 428/638 |
| 3,328,140 A | * | 6/1967 | Warren | 428/602 |
| 3,490,125 A | * | 1/1970 | Frieling, Jr. | 428/592 |
| 3,686,428 A | * | 8/1972 | Lombardi et al. | 174/128.1 |
| 3,784,732 A | * | 1/1974 | Whitfill, Jr. | 174/108 |
| 4,275,786 A | | 6/1981 | Lee | 166/66 |
| 5,495,547 A | | 2/1996 | Rafie et al. | 385/101 |
| 6,600,108 B1 | | 7/2003 | Mydur et al. | 174/120 |
| 6,631,095 B1 | * | 10/2003 | Bryant et al. | 367/20 |
| 6,649,843 B2 | * | 11/2003 | Aoyama et al. | 174/126.1 |
| 7,119,283 B1 | * | 10/2006 | Varkey et al. | 174/102 R |

FOREIGN PATENT DOCUMENTS

| | | |
|---|---|---|
| GB | 2321973 | 8/1998 |
| WO | 99/48111 | 9/1999 |

* cited by examiner

*Primary Examiner*—Chau N. Nguyen
(74) *Attorney, Agent, or Firm*—Dave Cate; Jaime Castano; Dale Gaudier

(57) ABSTRACT

Disclosed are electric cables with improved armor wires used with wellbore devices to analyze geologic formations adjacent a wellbore. The cables include at least one insulated conductor, and one or more armor wires surrounding the insulated conductor. The armor wires include a low density core surrounded by a corrosion resistant alloy clad, where the alloy clad includes such alloys as beryllium-copper based alloys, nickel-chromium based alloys, superaustenitic stainless steel alloys, nickel-cobalt based alloys, nickel-molybdenum-chromium based alloys, and the like. The low density core may be based upon titanium or titanium alloys. The cables of the invention may be any useful electric cable design, including monocables, quadcables, heptacables, quadcables, slickline cables, multiline cables, coaxial cables, or seismic cables.

18 Claims, 4 Drawing Sheets

LIGHTWEIGHT ARMOR WIRES FOR ELECTRICAL CABLES

BACKGROUND OF THE INVENTION

This invention relates to electric cables, and methods of manufacturing and using such cables. In one aspect, the invention relates to electric cables with light weight corrosion resistant armor wires used with wellbore devices to analyze geologic formations adjacent a wellbore, methods of manufacturing same, as well as uses of such cables.

Generally, geologic formations within the earth that contain oil and/or petroleum gas have properties that may be linked with the ability of the formations to contain such products. For example, formations that contain oil or petroleum gas have higher electrical resistivity than those that contain water. Formations generally comprising sandstone or limestone may contain oil or petroleum gas. Formations generally comprising shale, which may also encapsulate oil-bearing formations, may have porosities much greater than that of sandstone or limestone, but, because the grain size of shale is very small, it may be very difficult to remove the oil or gas trapped therein. Accordingly, it may be desirable to measure various characteristics of the geologic formations adjacent to a well before completion to help in determining the location of an oil- and/or petroleum gas-bearing formation as well as the amount of oil and/or petroleum gas trapped within the formation. The zones to be analyzed can be vertically underneath the well bore surface opening or at angles deviated up to 90 degrees or more from the main well bore.

Logging tools, which are generally long, pipe-shaped devices may be lowered into the well to measure such characteristics at different depths along the well. These logging tools may include gamma-ray emitters/receivers, caliper devices, resistivity-measuring devices, neutron emitters/receivers, and the like, which are used to sense characteristics of the formations adjacent the well. A wireline cable connects the logging tool with one or more electrical power sources and data analysis equipment at the earth's surface, as well as providing structural support to the logging tools as they are lowered and raised through the well. Generally, the wireline cable is spooled out of a truck or an offshore platform unit, over a pulley, and down into the well.

Wireline cables are typically formed from a combination of metallic conductors, insulative materials, filler materials, jackets, and metallic armor wires. Armor wires typically perform many functions in wireline cables, including protecting the electrical core from the mechanical abuse seen in typical downhole environment, and providing mechanical strength to the cable to carry the load of the tool string and the cable itself.

Armor wire performance may also be dependent on corrosion protection. Harmful fluids in the downhole environment may cause armor wire corrosion, and once the armor wire begins to corrode, strength and pliability may be quickly compromised. Although the cable core may still remain functional, it is not economically feasible to replace the armor wire(s), and the entire cable must typically be discarded.

Conventionally, wellbore electrical cables utilize galvanized steel armor wires (typically plain carbon steels in the range AISI 1065 and 1085), known in the art as Galvanized Improved Plow Steel (GIPS) armor wires, which do provide high strength. Such armor wires are typically constructed of cold-drawn pearlitic steel coated with zinc for moderate corrosion protection. The GIPS armor wires are protected by a zinc hot-dip or electrolytic coating that acts as a sacrificial layer when the wires are exposed to moderate environments.

Commonly, sour well cables constructed completely of corrosion resistant alloys are used in sour well downhole conditions. While such alloys are well suited for forming armor wires used in cables for such wells, it is commonly known that the strength of such alloys is very limited.

As deviations in the well bores are increasing, the zones to be reached for evaluation or production may be at large angles relative to the well bore opening. To reach these zones, the cable must be tractored, but the reach may be limited as cables with galvanized steel armor wires may not be sufficiently light to satisfy these requirements. Furthermore, deviated well bores are typically sour as higher concentrations of corrosive agents are typically present.

Thus, a need exists for electric cables that are low weight with improved corrosion and abrasion protection. An electrical cable that can overcome one or more of the problems detailed above while conducting larger amounts of power with significant data signal transmission capability, would be highly desirable, and the need is met at least in part by the following invention.

BRIEF SUMMARY OF THE INVENTION

In one aspect, the invention relates to electric cables with enhanced armor wires used with wellbore devices to analyze geologic formations adjacent a wellbore. The cables include at least one insulated conductor, and one or more armor wire layers surrounding the insulated conductor. The lightweight design of the armor wires used in the armor wire layers include a low density core surrounded by a corrosion resistant alloy clad (outer layer), such as a nickel based alloy, for example. A bonding layer may also be placed between the low density core and corrosion resistant alloy clad. The electrical cables may include a first armor wire layer surrounding the insulated conductor, and a second armor wire layer served around the first armor wire layer. The cables of the invention may be useful for a variety of applications including cables in subterranean operations, such as a monocable, a quadcable, a heptacable, slickline cable, multiline cable, a coaxial cable, or a seismic cable.

Any suitable material for forming a low density core may be used. Examples of such materials include titanium and its alloys, including, but not necessarily limited to alpha (or near alpha) alloys, beta alloys (i.e. Beta-C), alpha-beta alloys (i.e. Ti-6A1-4V), and the like. Materials useful to form the corrosion resistant alloy clad of the armor wires include, by non-limiting example, such alloys as copper-nickel-tin based alloys, beryllium-copper based alloys, nickel-chromium based alloys, superaustenitic stainless steel alloys, nickel-cobalt based alloys and nickel-molybdenum-chromium based alloys, and the like, or any mixtures thereof.

Insulation materials used to form insulated conductors useful in cables of the invention is include, but are not necessarily limited to, polyolefins, polyaryletherether ketone, polyaryl ether ketone, polyphenylene sulfide, modified polyphenylene sulfide, polymers of ethylene-tetrafluoroethylene, polymers of poly(1,4-phenylene), polytetrafluoroethylene, perfluoroalkoxy polymers, fluorinated ethylene propylene, polytetrafluoroethylene-perfluoromethylvinylether polymers, polyamide, polyurethane, thermoplastic polyurethane, chlorinated ethylene propylene, ethylene chloro-trifluoroethylene, and any mixtures thereof. Appropriate conductors are readily known to those in the art.

In another aspect, the invention relates to methods for preparing an electrical cable which includes forming the armor wires used to form the armor wire layers, providing at least one insulated conductor, serving a first layer of the armor wires around the insulated conductor, and serving a second layer of the same armor wires around the first layer of the armor wires. In one approach, the enhanced design of the armor wires are prepared by providing low density core, bringing the core strength member into contact with at least one sheets of a corrosion resistant alloy clad material, forming the sheet of alloy material around the high strength core, and drawing the combination of the alloy material and core strength member to a final diameter to form the lightweight design of the armor wire. Another approach to preparing the armor wires includes providing a low density core, extruding an alloy material around the core, and drawing the combination of the alloy material and core strength member to a final diameter to form the armor wire. The preparation of armor wires may also include coating the low density core with a bonding layer before forming the alloy clad material around the low density core.

BRIEF DESCRIPTION OF THE DRAWINGS

The invention may be understood by reference to the following description taken in conjunction with the accompanying drawings.

DETAILED DESCRIPTION OF THE INVENTION

Figure 1:
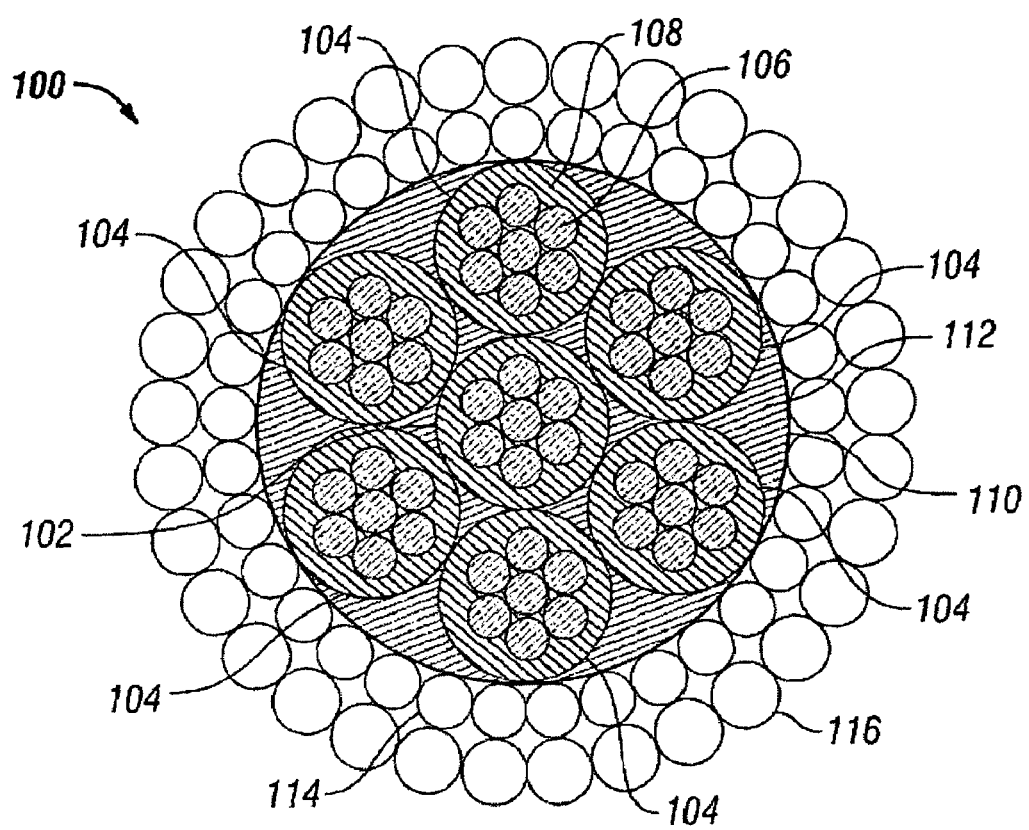
FIG. 1 is a cross-sectional view of a typical prior art cable design.

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The invention relates to electrical cables and methods of manufacturing the same, as well as uses thereof. In one aspect, the invention relates to an electrical cables used with devices to analyze geologic formations adjacent a wellbore, methods of manufacturing the same, and uses of the cables in seismic and wellbore operations. Designs for oilfield cables must strike a balance between weight, strength, corrosion resistance and materials and manufacturing resources. Wireline cables must support their own weights plus the weights of downhole tool strings. This invention addresses concerns by using an alloy-clad material with a low density core. The outer clad is designed to be resistant to corrosion, abrasion, and galling.

While this invention and its claims are not bound by any particular mechanism of operation or theory, it has been discovered that using certain alloys to form an alloy clad upon a low density core in preparing an armor wire, provides lighter weight per length electrical cables with resistance to corrosion, abrasion resistance, and possess reasonably high strength properties. By low density core it is meant the core is form substantially from a material with a density up to about 4.8 g/cm$^3$, for example, from about 4.2 g/cm$^3$ to about 4.8 g/cm$^3$. In the case of titanium and its alloys when used as a core, as it has a lower density material than steel, the resulting wire weights are significantly less. This lower weight increases strength-to-weight ratio, enables the use of lighter duty well-service trucks, as well as increases the reach into highly deviated wells.

Titanium or titanium alloys, when used alone as a cable component, is known to be somewhat unsuitable for oilfield cable application, particularly as titanium is subject to galling (damage caused by adhesive friction) when titanium parts rub against each other. As such, galling renders titanium difficult for an application such as armor wires, where wires are in constant contact with each other under high tensions. Galling resistance for titanium in cables can be mitigated by expensive alloying also and by creating an impurity layer on the surface of the wire. The impurities that can be created on the wire surface cannot be exposed to excessive torsional loading that the wire and the cable is exposed to during manufacturing and deployment, and the impurities can lead to potential fracture initiation sites. However, inventors have discovered that placing a cladding over a lightweight titanium or titanium alloy core can overcome the problems described above, or at least in part. The clad material also offers a significant increase in the corrosion resistance of the wire. This is typically useful when the cable is used in highly corrosive environments such as sour and highly deviated wellbores.

In some embodiments of the invention, the lightweight armor wires used in the cables are prepared from a metal billet made of a low density titanium or its alloy core and a clad made of a corrosion resistant metal, such as austenitic stainless steel, Inconel®, and the like. The clad may be extruded over the titanium core or may be formed over the core and then seam-welded. The billet is drawn to a smaller diameter to form armor wire stock. The ratio of clad width to core width remains constant as the billet is drawn to a smaller diameter. The completed armor wire density or weight per length can be as much as about 40% less than standard GIPS armor wire, with significant gains in strength to weight ratios.

Cable embodiments of the invention generally include at least one insulated conductor, and at least one layer of high strength corrosion resistant armor wires surrounding the insulated conductor(s). Insulated conductors useful in the embodiments of the invention include metallic conductors, or even one or more optical fibers. Such conductors or optical fibers may be encased in an insulated jacket. Any suitable metallic conductors may be used. Examples of metallic conductors include, but are not necessarily limited to, copper, nickel coated copper, or aluminum. Preferred metallic conductors are copper conductors. While any suitable number of metallic conductors may be used in forming the insulated conductor, preferably from 1 to about 60 metallic conductors are used, more preferably 7, 19, or 37 metallic conductors. Components, such as conductors, armor wires, filler, optical fibers, and the like, used in cables according to the invention may be positioned at zero helix angle or any suitable helix angle relative to the center axis of the cable. Generally, a central insulated conductor is positioned at zero helix angle, while those components a surrounding the central insulated conductor are helically positioned around the central insulated conductor at desired helix angles. A pair of layered armor wire layers may be contra-helically wound, or positioned at opposite helix angles.

Insulating materials useful to form the insulation for the conductors and insulated jackets may be any suitable insulating materials known in the art. Non-limiting examples of insulating materials include polyolefins, polytetrafluoroethylene-perfluoromethylvinylether polymer (MFA), perfluoroalkoxyalkane polymer (PFA), polytetrafluoroethylene polymers (PTFE), ethylene-tetrafluoroethylene polymers (ETFE), ethylene-propylene copolymers (EPC), poly(4-methyl-1-pentene) (TPX® available from Mitsui Chemicals, Inc.), other fluoropolymers, polyaryletherether ketone polymers (PEEK), polyphenylene sulfide polymers (PPS), modified polyphenylene sulfide polymers, polyether ketone polymers (PEK), maleic anhydride modified polymers, perfluoroalkoxy polymers, fluorinated ethylene propylene polymers, polytetrafluoroethylene-perfluoromethylvinylether polymers, polyamide polymers, polyurethane, thermoplastic polyurethane, ethylene chloro-trifluoroethylene polymers (such as Halar®), chlorinated ethylene propylene polymers, Parmax® SRP polymers (self-reinforcing polymers manufactured by Mississippi Polymer Technologies, Inc. based on a substituted poly (1,4-phenylene) structure where each phenylene ring has a substituent R group derived from a wide variety of organic groups), or the like, and any mixtures thereof.

In some embodiments of the invention, the insulated conductors are stacked dielectric insulated conductors, with electric field suppressing characteristics, such as those described in U.S. Pat. No. 6,600,108 (Mydur, et al.), incorporated herein by reference. Such stacked dielectric insulated conductors generally include a first insulating jacket layer disposed around the metallic conductors wherein the first insulating jacket layer has a first relative permittivity, and, a second insulating jacket layer disposed around the first insulating jacket layer and having a second relative permittivity that is less than the first relative permittivity. The first relative permittivity is within a range of about 2.5 to about 10.0, and the second relative permittivity is within a range of about 1.8 to about 5.0.

Electrical cables according to the invention may be of any practical design. The cables may be wellbore cables, including monocables, coaxial cables, quadcables, heptacables, seismic cables, slickline cables, multi-line cables, and the like. In coaxial cable designs of the invention, a plurality of metallic conductors surround the insulated conductor, and are positioned about the same axis as the insulated conductor. Also, for any cables of the invention, the insulated conductors may further be encased in a tape. All materials, including the tape disposed around the insulated conductors, may be selected so that they will bond chemically and/or mechanically with each other. Armor wires used in the invention make possible lightweight, lower modulus wireline cables, especially desirable for downhole tractor applications. Cables of the invention may have an outer diameter from about 0.5 mm to about 400 mm, preferably, a diameter from about 1 mm to about 100 mm, more preferably from about 2 mm to about 15 mm.

Armor wires useful for cable embodiments of the invention, may have titanium or its alloys placed at the core of the armor wires. An alloy with resistance to corrosion and reduction of galling is then clad over the core. The corrosion resistant alloy layer may be clad over the low density core by extrusion or by forming over the core. The corrosion and improved galling resistant clad may be from about 50 microns to about 600 microns in thickness. The material used for the corrosion and improved galling resistant clad may be any suitable alloy that provides sufficient corrosion resistance and abrasion resistance when used as a clad. The alloys used to form the clad may also have tribological properties adequate to improve the abrasion resistance and lubricating of interacting surfaces in relative motion, or improved corrosion resistant properties that minimize gradual wearing by chemical action, or even both properties.

While any suitable alloy may be used as a corrosion resistant alloy clad to form the armor wires according to the invention, some examples include, but are not necessarily limited to: beryllium-copper based alloys; nickel-chromium based alloys (such as Inconel® available from Reade Advanced Materials, Providence, R.I. USA 02915-0039); superaustenitic stainless steel alloys (such as 20Mo6® of Carpenter Technology Corp., Wyomissing, Pa. 19610-1339 U.S.A., INCOLOY® alloy 27-7MO and INCOLOY® alloy 25-6MO from Special Metals Corporation of New Hartford, N.Y., U.S.A., or Sandvik 13RM19 from Sandvik Materials Technology of Clarks Summit, Pa. 18411, U.S.A.); nickel-cobalt based alloys (such as MP35N from Alloy Wire International, Warwick, R.I., 02886 U.S.A.); copper-nickel-tin based alloys (such as ToughMet® available from Brush Wellman, Fairfield, N.J., USA); or, nickel-molybdenum-chromium based alloys (such as HASTELLOY® C276 from Alloy Wire International). The corrosion resistant alloy clad may also be an alloy comprising nickel in an amount from about 10% to about 60% by weight of total alloy weight, chromium in an amount from about 15% to about 30% by weight of total alloy weight, molybdenum in an amount from about 2% to about 20% by weight of total alloy weight, cobalt in an amount up to about 50% by weight of total alloy weight, as well as relatively minor amounts of other elements such as carbon, nitrogen, titanium, vanadium, or even iron. The preferred alloys are nickel-chromium based alloys, and nickel-cobalt based alloys.

Cables according to the invention include at least one layer of armor wires surrounding the insulated conductor. The armor wires used in cables of the invention, comprising a low density core and a corrosion resistant alloy clad may be used alone, or may be combined with other types of armor wires, such as galvanized improved plow steel wires, superaustenitic stainless steel armor wires, or even wire rope armor wires, to form the armor wire layers. Preferably, two layers of armor wires are used to form preferred electrical cables of the invention.

Referring now to FIG. 1, a cross-sectional view of a typical heptacable design. FIG. 1 depicts a cross-section of a typical armored cable design used for downhole applications. The cable 100 includes a central conductor bundle 102 having multiple conductors and an outer polymeric insulating material. The cable 100 further includes a plurality of outer conductor bundles 104, each having several metallic conductors 106 (only one indicated), and a polymeric insulating material 108 surrounding the outer metallic conductors 106. Preferably, the metallic conductor 106 may be a copper conductor. The central conductor bundle 102 of a typical prior art cables, although need not be, is typically the same design as the outer conductor bundles 104. An optional tape and/or tape jacket 110 made of a material that may be either electrically conductive or electrically non-conductive and that is capable of withstanding high temperatures encircles the outer conductor bundles 104. The volume within the tape and/or tape jacket 110 not taken by the central conductor bundle 102 and the outer conductors 104 is filled with a filler 112, which may be made of either an electrically conductive or an electrically non-conductive material. A first armor layer 114 and a second armor layer 116, generally made of a high tensile strength galvanized improved plow steel (GIPS) armor wires, surround and protect the tape and/or tape jacket 110, the filler 112, the outer conductor bundles 104, and the central conductor bundle 102.

Figure 2:
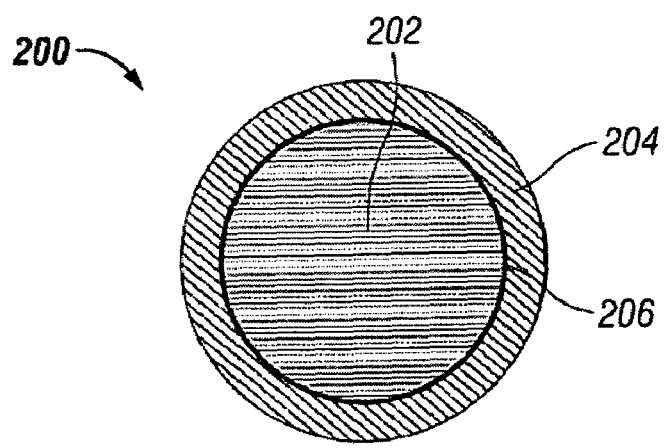
FIG. 2 is a stylized cross-sectional representation of an armor wire design useful in some cables of the invention.

FIG. 2 is a stylized cross-sectional representation of a lightweight armor wire design. The armor wire 200 includes a low density core 202, surrounded by a corrosion resistant alloy clad 204. An optional bonding layer 206 may be placed between the core 202 and alloy clad 204. The core 202 may be generally made of any low density material such as, by non-limiting example, titanium and its alloys. Examples of suitable alloys which may be used as core strength members include, but are not necessarily limited to CP Grades 1, 2, 3, etc., Beta-C, Ti-6A1-4V. The core strength member 202 can include Titanium core for low density, or even plated or coated wires. When used, the bonding layer 206 may be any material useful in promoting a strong bond between the high strength core 202 and corrosion resistant alloy clad 204. The microstructure phase of the low density core can be alpha, alpha-beta or beta.

Figure 3:
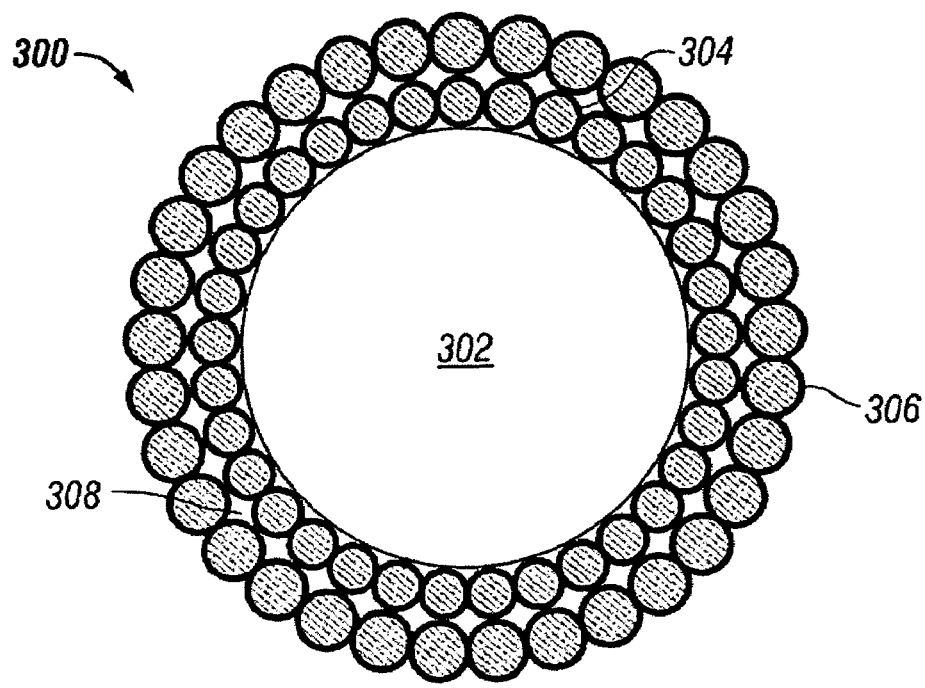
FIG. 3 is a cross-sectional representation of a general cable design according to the invention using two layers of armor wires

Referring now to FIG. 3, a cross-sectional representation of a general cable design according to the invention which incorporates two layers of armor wires. The cable 300 includes at least one insulated conductor 302 and two layers of armor wires, 304 and 306. The insulated conductor 302 may be a heptacable, quadcable, monocable, or even coaxial cable design. The armor wire layers, 304 and 306, surrounding the insulated conductor(s) 302 include armor wires, such as armor wire 200 in FIG. 2, comprising a low density core and a corrosion resistant alloy clad. Optionally, in the interstitial spaces 308, formed between armor wires, as well as formed between armor wires and insulated conductor(s) 302, a polymeric material may be disposed.

Polymeric materials disposed in the interstitial spaces 308 may be any suitable material. Some useful polymeric materials include, by nonlimiting example, polyolefins (such as EPC or polypropylene), other polyolefins, polyaryletherether ketone (PEEK), polyaryl ether ketone (PEK), polyphenylene sulfide (PPS), modified polyphenylene sulfide, polymers of ethylene-tetrafluoroethylene (ETFE), polymers of poly(1,4-phenylene), polytetrafluoroethylene (PTFE), perfluoroalkoxy (PFA) polymers, fluorinated ethylene propylene (FEP) polymers, polytetrafluoroethylene-perfluoromethylvinylether (MFA) polymers, Parmax®, and any mixtures thereof. Preferred polymeric materials are ethylene-tetrafluoroethylene polymers, perfluoroalkoxy polymers, fluorinated ethylene propylene polymers, and polytetrafluoroethylene-perfluoromethylvinylether polymers. The polymeric materials may be disposed contiguously from the insulated conductor to the outermost layer of armor wires, or may even extend beyond the outer periphery thus forming a polymeric jacket that completely encases the armor wires.

A protective polymeric coating may be applied to strands of armor wire for additional protection, or even to promote bonding between the armor wire and any polymeric material disposed in the interstitial spaces. As used herein, the term bonding is meant to include chemical bonding, mechanical bonding, or any combination thereof. Examples of coating materials which may be used include, but are not necessarily limited to, fluoropolymers, fluorinated ethylene propylene (FEP) polymers, ethylene-tetrafluoroethylene polymers (Tefzel®), perfluoro-alkoxyalkane polymer (PFA), polytetrafluoroethylene polymer (PTFE), polytetrafluoroethylene-perfluoromethylvinylether polymer (MFA), polyaryletherether ketone polymer (PEEK), or polyether ketone polymer (PEK) with fluoropolymer combination, polyphenylene sulfide polymer (PPS), PPS and PTFE combination, latex or rubber coatings, and the like. Each armor wire may also be plated with materials for corrosion protection or even to promote bonding between the armor wire and polymeric material. Nonlimiting examples of suitable plating materials include copper alloys, and the like. Plated armor wires may even include cords such as tire cords. While any effective thickness of plating or coating material may be used, a thickness from about 10 microns to about 100 microns is preferred.

Figure 4:
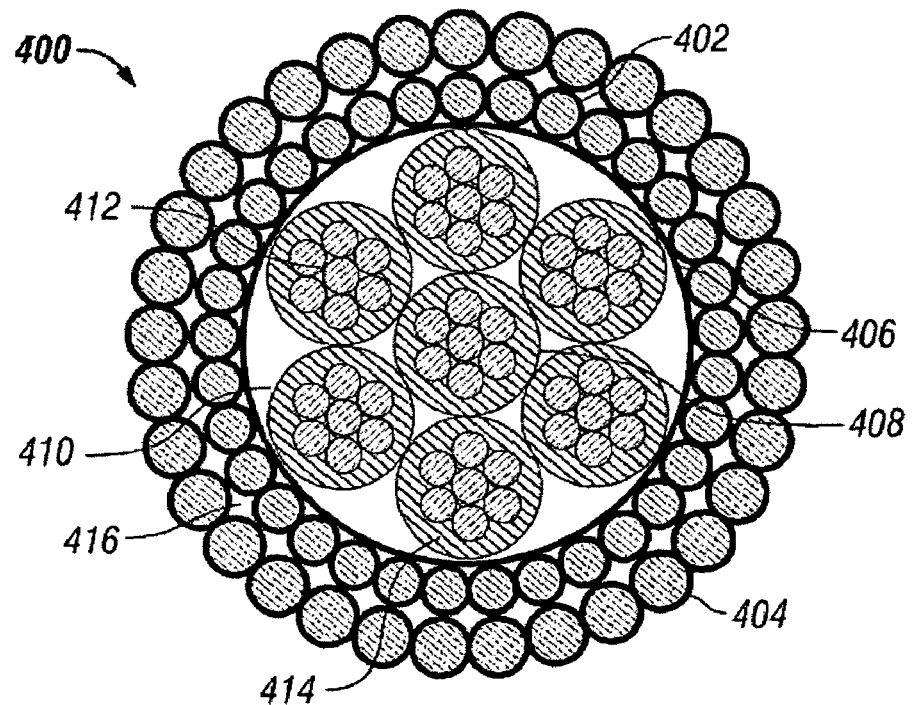
FIG. 4 is a cross-sectional representation of a heptacable design according to the invention, including two layers of armor wires.

FIG. 4 is a cross-sectional representation of a heptacable design according to the invention, including two layers of armor wires. The cable 400 includes two layers of armor wires, 402 and 404, surrounding a tape and/or tape jacket 406. The armor wire layers, 402 and 404, include armor wires, such as armor wire 200 in FIG. 2, comprising a low density core and a corrosion resistant alloy clad. The interstitial space within the tape and/or tape jacket 406 comprises a central insulated conductor 408 and six outer insulated conductors 410 (only one indicated). The interstitial space within the tape and/or tape jacket 406, not occupied by the central insulated conductor 408 and six outer insulated conductors 410 may be filled with a suitable filler material, which may be made of either an electrically conductive or an electrically non-conductive material. The central insulated conductor 408 and six outer insulated conductors 410, each have a plurality of conductors 412 (only one indicated), and insulating material 414 surrounding the conductors 412. Preferably, the conductor 412 is a copper conductor. Optionally, a polymeric material may be disposed in the interstitial spaces 416, formed between armor wires, as well as formed between armor wires and tape jacket 406.

Figure 5:
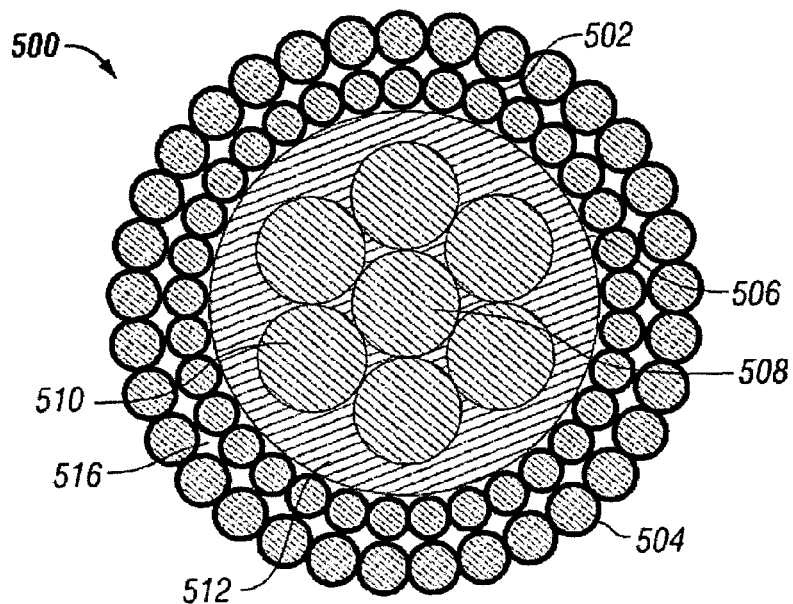
FIG. 5 represents, by stylized cross-section, a monocable design according to the invention.

FIG. 5 represents, by stylized cross-section, a monocable design according to the invention. The cable 500 includes two layers of armor wires, 502 and 504, surrounding a tape and/or tape jacket 506. The armor wire layers, 502 and 504, include armor wires, such as armor wire 200 in FIG. 2, comprising a high strength core and a corrosion resistant alloy clad. The central conductor 508 and six outer conductors 510 (only one indicated) are surrounded by tape jacket 506 and layers of armor wires 502 and 504. Preferably, the conductors 508 and 510 are copper conductors. The interstitial space formed between the tape jacket 506 and six outer conductors 510, as well as interstitial spaces formed between the six outer conductors 510 and central conductor 508 the may be filled with an insulating material 512 to form an insulated conductor. Optionally, a polymeric material may be disposed in the interstitial spaces 516, formed between armor wires, as well as formed between armor wires and tape jacket 506.

Figure 6:
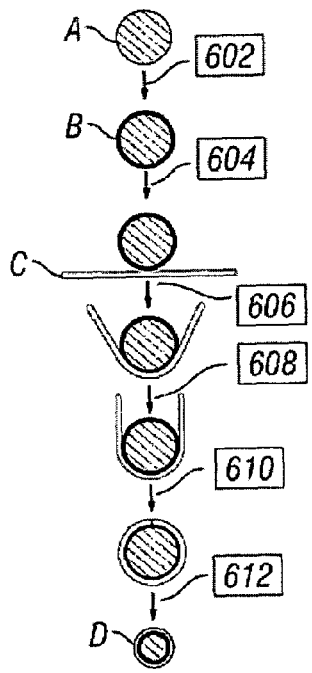
FIG. 6 illustrates a method of preparing armor wires useful in cables according to the invention.

FIG. 6 illustrates a method of preparing some armor wires useful in cables according to the invention. Accordingly, a low density core A is provided. At point 602, the core A may optionally be coated with a bonding layer B, such as brass using a hot dip or electrolytic deposition process. At point 604 the optional bonding layer coated core A is brought into contact with a sheet of corrosion resistant alloy material C, such as, by nonlimiting example, Inconel® nickel-chromium based alloy. The alloy material C is used to prepare the corrosion resistant alloy clad. At points 606, 608, and 610, the alloy material is formed around the optional bonding layer core A, using, for example, rollers. Such forming of the alloy material is done at temperatures between ambient temperature and about 850° C. Additionally, the optional bonding layer B may flow and to sufficiently provide a slipping interface between the high strength core A and the corrosion resistant alloy clad comprised of alloy material C. At point 612, the wire is drawn down (not necessarily to scale as illustrated) to a final diameter to form the armor wire D. The drawn thicknesses of the optional bonding layer coated core A alloy clad C may be proportional to the pre-drawn thickness.

Figure 7:
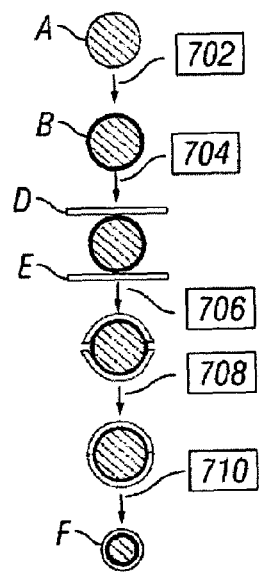
FIG. 7 illustrates another method of preparing some armor wires useful in cables according to the invention.

FIG. 7 illustrates another method of preparing armor wires. According to this next method, a low density core A is provided, and at point 702, the high strength core A is optionally coated with a bonding layer B. At point 704 the optional bonding layer coated core A is brought into contact with two separate sheets of corrosion resistant alloy material, D and E, to form the corrosion resistant alloy clad. At points 706 and 708, the sheets of alloy material are formed around the optional bonding layer coated core A. At point 710, the wire is drawn down to final diameter to form the armor wire F.

Figure 8:
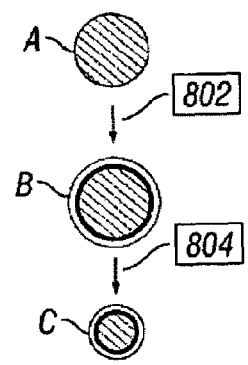
FIG. 8 illustrates yet another method of preparing some armor wires.

FIG. 8 illustrates yet another method of preparing armor wires, an extrusion and drawing method. Accordingly, a high strength core A is provided, and at point 802, and corrosion resistant alloy clad B is extruded over core A. The material forming the corrosion resistant alloy clad B may be hot or cold extruded onto the core A. At 804, the wire is drawn down (not necessarily to scale as illustrated) to a final diameter to form the armor wire C. Further, the high strength core A may be optionally coated with a bonding layer prior to extruding the corrosion resistant alloy clad B.

Figure 9:
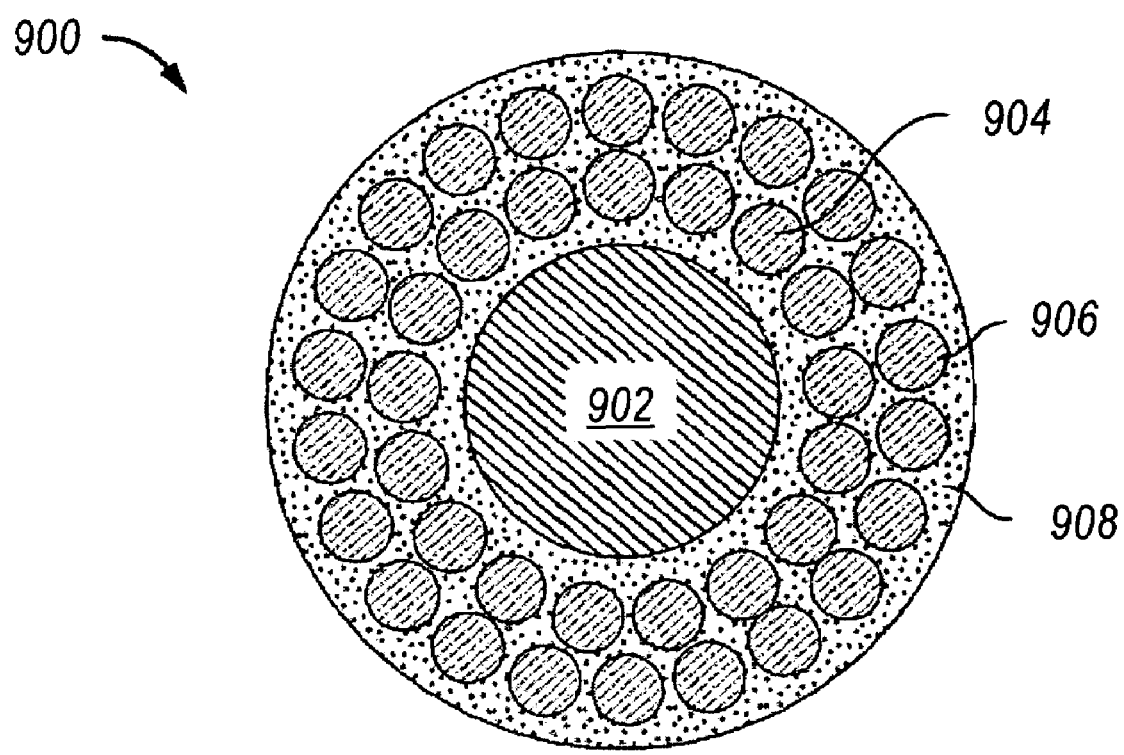
FIG. 9 is a cross-sectional representation of cables of the invention which include a polymeric material disposed about the armor wires

Referring now to FIG. 9, a cross-sectional generic representation of some cables of the invention which include a polymeric material disposed about the armor wires. The cables include an insulated conductor core 902 which comprises insulated conductors in such configurations as heptacables, monocables, coaxial cables, slickline cables, or even quadcables. A polymeric material 908 is contiguously disposed in the interstitial spaces formed between layers of armor wires 904 and 906, and interstitial spaces formed between the armor wires 904 and core 902. The layers of armor wires 904 and 906 are composed of armor wires comprising a low density core and a corrosion resistant alloy clad. The polymeric material 908 may further include short fibers. The inner armor wires 904 are evenly spaced when cabled around the core 902. The polymeric material 908 may extend beyond the periphery of outer armor wire layer 906 to form a polymeric jacket thus forming a polymeric encased cable 900.

The materials forming the insulating layers and the polymeric materials used in the cables according to the invention may further include a fluoropolymer additive, or fluoropolymer additives, in the material admixture used to form the cable. Such additive(s) may be useful to produce long cable lengths of high quality at high manufacturing speeds. Suitable fluoropolymer additives include, but are not necessarily limited to, polytetrafluoroethylene, perfluoroalkoxy polymer, ethylene tetrafluoroethylene copolymer, fluorinated ethylene propylene, perfluorinated poly(ethylene-propylene), and any mixture thereof. The fluoropolymers may also be copolymers of tetrafluoroethylene and ethylene and optionally a third comonomer, copolymers of tetrafluoroethylene and vinylidene fluoride and optionally a third comonomer, copolymers of chlorotrifluoroethylene and ethylene and optionally a third comonomer, copolymers of hexafluoropropylene and ethylene and optionally third comonomer, and copolymers of hexafluoropropylene and vinylidene fluoride and optionally a third comonomer. The fluoropolymer additive should have a melting peak temperature below the extrusion processing temperature, and preferably in the range from about 200° C. to about 350° C. To prepare the admixture, the fluoropolymer additive is mixed with the insulating jacket or polymeric material. The fluoropolymer additive may be incorporated into the admixture in the amount of about 5% or less by weight based upon total weight of admixture, preferably about 1% by weight based or less based upon total weight of admixture, more preferably about 0.75% or less based upon total weight of admixture.

Cables of the invention may include armor wires employed as electrical current return or supply wires which provide paths to ground for downhole equipment or tools. The invention enables the use of armor wires for current return while minimizing electric shock hazard. In some embodiments, a polymeric material isolates at least one armor wire in the first layer of armor wires thus enabling their use as electric current return wires.

The present invention is not limited, however, to cables having only metallic conductors. Optical fibers may be used in order to transmit optical data signals to and from the device or devices attached thereto, which may result in higher transmission speeds, lower data loss, and higher bandwidth.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values. Accordingly, the protection sought herein is as set forth in the claims below.

What is claimed is:

1. An electric cable comprising at least one insulated conductor and at least one armor wire layer surrounding the insulated conductor, wherein the armor wire layer comprises armor wires comprising a low density core and a corrosion resistant alloy outer clad, wherein the low density core is titanium or any titanium alloy, and the corrosion resistant alloy clad is an alloy comprising nickel in an amount from about 10% to about 60% by weight of total alloy weight, chromium in an amount from about 15% to about 30% by weight of total alloy weight, molybdenum in an amount from about 2% to about 20% by weight of total alloy weight, and cobalt in an amount up to about 50% by weight of total alloy weight.

2. A cable according to claim 1 wherein the insulated conductor comprises at least one electrical conductor encased in an insulating material.

3. A cable according to claim 2 wherein the insulation material is selected from the group consisting of polyolefins, polyaryletherether ketone, polyaryl ether ketone, polyphenylene sulfide, modified polyphenylene sulfide, polymers of ethylene-tetrafluoroethylene, polymers of poly(1,4-phenylene), polytetrafluoroethylene, perfluoroalkoxy polymers, fluorinated ethylene propylene, polytetrafluoroethylene-perfluoromethylvinylether polymers, polyamide, polyurethane, thermoplastic polyurethane, chlorinated ethylene propylene, ethylene chloro-trifluoroethylene, and any mixtures thereof.

4. A cable according to claim 2 wherein the insulating material comprises:
   (a) a first insulating jacket layer disposed around the metallic conductors wherein the first insulating jacket layer has a first relative permittivity; and
   (b) a second insulating jacket layer disposed around the first insulating jacket layer and having a second relative permittivity that is less than the first relative permittivity;
wherein the first relative permittivity is within a range of about 2.5 to about 10.0, and wherein the second relative permittivity is within a range of about 1.8 to about 5.0.

5. A cable according to claim 1 where a bonding layer is placed between the low density core and the corrosion resistant alloy clad.

6. A cable according to claim 1 the at least one armor wire layer comprises a first armor wire layer surrounding the insulated conductor and a second armor wire layer served around the first armor wire layer.

7. A cable according to claim 6 further comprising a polymeric material disposed in interstitial spaces formed between the armor wires, as well as formed between the armor wires and insulated conductor, and further wherein the polymeric material forms a polymeric jacket around the periphery of the second armor wire layer.

8. A cable according to claim 1 further comprising a polymeric material disposed in interstitial spaces formed between the armor wires, as well as formed between the armor wires and insulated conductor.

9. A cable according to claim 1 wherein the corrosion resistant alloy clad comprises an alloy selected from the group consisting of beryllium-copper based alloys, copper-nickel-tin based alloys, superaustenitic stainless steel alloys, nickel-cobalt based alloys, nickel-chromium based alloys, nickel-molybdenum-chromium based alloys, and any mixtures thereof.

10. A cable according to claim 1 wherein the corrosion resistant alloy clad comprises a nickel-chromium based alloy or a nickel-cobalt based alloy.

11. A cable according to claim 1 which has an outer diameter from about 0.5 mm to about 400 mm.

12. A cable according to claim 1 wherein the cable is a seismic cable, or a wellbore cable selected from the group consisting of monocable, a quadcable, a heptacable, a quadcable, slickline cable, multiline cable, and a coaxial cable.

13. A wellbore electrical cable according to claim 1 wherein the at least one insulated conductor comprises seven metallic conductors encased in an insulating material, and wherein the at least one armor wire layer comprises a first layer of armor wires surrounding the insulated conductor and a second layer of armor wires surrounds the first layer of armor wires.

14. A wellbore electrical cable according to claim 13 wherein the at least one insulated conductor comprises seven insulated conductors in a heptacable design.

15. An electric cable according to claim 1 wherein the corrosion resistant alloy clad is extruded over the low density core, and the clad and core are drawn to form the armor wires.

16. An electric cable according to claim 1 wherein the corrosion resistant alloy clad is at least one sheath of corrosion resistant alloy formed over the low density core, and the clad and core are drawn to form the armor wires.

17. An electric cable according to claim 1 wherein the low density core has a density up to about 4.8 g/cm$^3$.

18. An electric cable according to claim 17 wherein the low density core has a density from about 4.2 g/cm$^3$ to about 4.8 g/cm$^3$.

* * * * *